United States Patent
Wada et al.

(10) Patent No.: US 11,535,730 B2
(45) Date of Patent: Dec. 27, 2022

(54) HIGH STRENGTH HEAT RESISTANT RUBBER COMPOSITION AND PROCESS FOR PRODUCING HIGH STRENGTH HEAT RESISTANT RUBBER PRODUCT

(71) Applicant: Kyoichi Wada, Kanagawa-ken (JP)

(72) Inventors: Kyoichi Wada, Kanagawa-ken (JP); Tianning Ding, Fujian (CN)

(73) Assignee: Kyoichi Wada, Kanagawa-Ken (JP)

( * ) Notice: Subject to any disclaimer, the term of this patent is extended or adjusted under 35 U.S.C. 154(b) by 85 days.

(21) Appl. No.: 16/958,173

(22) PCT Filed: Dec. 25, 2018

(86) PCT No.: PCT/JP2018/047478
§ 371 (c)(1),
(2) Date: Aug. 11, 2020

(87) PCT Pub. No.: WO2019/131593
PCT Pub. Date: Jul. 4, 2019

(65) Prior Publication Data
US 2020/0377697 A1 Dec. 3, 2020

(30) Foreign Application Priority Data

Dec. 26, 2017 (CN) .......................... 201711428893

(51) Int. Cl.
| | | |
|---|---|---|
| *C08L 7/00* | (2006.01) | |
| *C08K 3/04* | (2006.01) | |
| *C08K 3/22* | (2006.01) | |
| *C08K 3/30* | (2006.01) | |
| *C08K 3/34* | (2006.01) | |
| *C08K 5/098* | (2006.01) | |
| *C08K 5/14* | (2006.01) | |
| *C08K 5/3415* | (2006.01) | |
| *C08K 11/00* | (2006.01) | |
| *C08K 13/08* | (2006.01) | |
| *C08L 23/04* | (2006.01) | |
| *C08L 93/04* | (2006.01) | |
| *B29C 45/00* | (2006.01) | |

(52) U.S. Cl.
CPC ........ *C08L 7/00* (2013.01); *C08K 3/04* (2013.01); *C08K 3/22* (2013.01); *C08K 3/30* (2013.01); *C08K 3/346* (2013.01); *C08K 5/098* (2013.01); *C08K 5/14* (2013.01); *C08K 5/3415* (2013.01); *C08K 11/005* (2013.01); *C08K 13/08* (2013.01); *C08L 23/04* (2013.01); *C08L 93/04* (2013.01); *B29C 45/0001* (2013.01); *C08K 2003/2296* (2013.01); *C08K 2003/3045* (2013.01); *C08K 2201/003* (2013.01); *C08L 2201/08* (2013.01); *C08L 2205/03* (2013.01); *C08L 2207/066* (2013.01)

(58) Field of Classification Search
CPC ....................................................... C08L 7/00
See application file for complete search history.

(56) References Cited

FOREIGN PATENT DOCUMENTS

| | | |
|---|---|---|
| CN | 105968809 | 9/2016 |
| EP | 1 199 331 | 4/2002 |
| EP | 2 316 879 | 5/2011 |
| EP | 2 316 880 | 5/2011 |
| JP | 07-286081 | 10/1995 |
| JP | 2004-182827 | 7/2004 |
| JP | 2006-57003 | 3/2006 |
| JP | 2006-131718 | 5/2006 |
| JP | 2011-225717 | 11/2011 |
| JP | 2013-155300 | 8/2013 |
| JP | 2013-237724 | 11/2013 |
| JP | 2014-508700 | 4/2014 |

OTHER PUBLICATIONS

Office Action dated Sep. 9, 2019 in corresponding Chinese Patent Application No. 201711428893.X, with English Translation.
Office Action dated Apr. 3, 2020 in corresponding Chinese Patent Application No. 201711428893.X, with English Translation.
Translation of International Preliminary Report on Patentability and Written Opinion dated Jul. 9, 2020 in corresponding International (PCT) Application No. PCT/JP2018/047478.
Extended European Search Report dated Sep. 20, 2021 in European Patent Application No. 18893973.0.

*Primary Examiner* — Arrie L Reuther
(74) *Attorney, Agent, or Firm* — Wenderoth Lind & Ponack LLP

(57) ABSTRACT

According to the invention, a high strength heat resistant rubber composition having both excellent strength and heat resistance, comprising: 80 to 85 parts by mass of a rubber base material; 5 to 11 parts by mass of attapulgite; 40 to 50 parts by mass of a linear low-density polyethylene; 4 to 6 parts by mass of a ceramic powder; 2 to 6 parts by mass of a cross-linking agent; 5 to 9 parts by mass of a filler; 5 to 9 parts by mass of a cross-linking aid; 8 to 13 parts by mass of rosin; 12 to 16 parts by mass of bismaleimide; and 7 to 12 parts by mass of yttrium oxide and a process for producing a high strength heat resistant rubber product using the composition are provided.

12 Claims, No Drawings

US 11,535,730 B2

HIGH STRENGTH HEAT RESISTANT RUBBER COMPOSITION AND PROCESS FOR PRODUCING HIGH STRENGTH HEAT RESISTANT RUBBER PRODUCT

CROSS-REFERENCE TO RELATED APPLICATIONS

The present application claims priority based on Chinese Patent Application No. 201711428893.X filed on Dec. 26, 2017, the entire disclosures of which are incorporated by reference into the disclosure of the present specification.

BACKGROUND OF THE INVENTION

Field of the Invention

The present invention relates to the technical field of rubber compositions, and more particularly to a high strength heat resistant rubber composition and a process for producing a high strength heat resistant rubber product.

Background Art

A rubber product means various rubber products produced from a natural rubber and a synthetic rubber as raw materials. Such rubber product further includes rubber products re-produced by using waste rubber. The rubber products often found on the market are, for example, rubber gloves, rubber sheets or rubber sealing rings, which are mainly used as waterproof, electrically insulating members or sealing members.

However, it may be necessary to use rubber products in high temperature working environments. The rubber products used in such a relatively high temperature environment are required to have the characteristics of a high temperature resistance and being easy to operate it. In the prior art conventional rubber products, there is a problem that the rubber products easily soften under the high temperature environment and thus that it is possibility to damage the user or other articles in contact with the rubber products. Therefore, it is desired to provide a heat resistant rubber having high stability and high strength as to satisfy the required characteristics when used in a high temperature working environment and having excellent high temperature resistance.

Conventionally, as such a heat-resistant rubber, for example, a heat-resistant rubber composition using a fluorine-based rubber component (Patent Document 1), a modified ethylene-propylene-diene copolymer (EPDM) (Patent Document 2) and a heat-resistant anti-vibration rubber, which are suitably used in in a high temperature environment such as an automobile engine room, containing a natural rubber (NR) and an ethylene-propylene-diene copolymer (EPDM) as rubber components, an organic peroxide as a vulcanizing agent, and a lower alkylphenol disulfide as a co-crosslinking agent (Patent Document 3) are known.

However, the heat-resistant rubber composition proposed hitherto is not always sufficiently satisfactory in heat resistance while using relatively expensive material components. Therefore, there is a demand for development of a heat-resistant rubber composition that is excellent in both high stability and high strength and heat resistance and is relatively advantageous in cost reduction.

PRIOR ART REFERENCE

Patent Documents

Patent Document 1: JPH07-286081
Patent Document 2: JP2006-57003
Patent Document 3: JP2011-225717

SUMMARY OF THE INVENTION

The present invention provides a solution to the above-mentioned problems in the prior art and an object thereof is to provide a high strength heat resistant rubber composition having high stability, high strength and high temperature resistance.

The above technical problems could be realized by the present invention described below.

That is, the high strength heat-resistant rubber composition according to the present invention is characterized in that the high strength heat resistant rubber composition having both excellent strength and heat resistance, comprising:
  80 to 85 parts by mass of a rubber base material;
  5 to 11 parts by mass of attapulgite;
  40 to 50 parts by mass of a linear low-density polyethylene;
  4 to 6 parts by mass of a ceramic powder;
  2 to 6 parts by mass of a cross-linking agent;
  5 to 9 parts by mass of a filler;
  5 to 9 parts by mass of a cross-linking aid;
  8 to 13 parts by mass of rosin;
  12 to 16 parts by mass of bismaleimide; and
  7 to 12 parts by mass of yttrium oxide.

In a preferred embodiment of the present invention, the filler comprises;
  5 to 10 parts by mass of $CaSO_4$;
  5 to 11 parts by mass of montmorillonite;
  5 to 10 parts by mass of calcium silicate;
  3 to 6 parts by mass of sodium stearate;
  4 to 7 parts by mass of zinc oxide; and
  1 to 2 parts by mass of a carbon black.

Further the cross-linking agent is preferably a silane coupling agent. Specifically, a silane coupling agent KH 550 and a polyamide 650 are preferably used.

In the yet another embodiment of the invention, the cross-linking aid is preferably dicumyl peroxide (DCP).

It should be understood that the content of each component above mentioned means an optimal content which can achieve an excellent strength and heat resistance of the objects of the invention.

Further, a process for producing a high strength heat resistant rubber composition having both excellent strength and heat resistance according to the invention, comprising the steps of:
  a primary kneading step of supplying and mixing 80 to 85 parts by mass of a rubber base material, 5 to 11 parts by mass of attapulgite, 40 to 50 parts by mass of a linear low-density polyethylene and 4 to 6 parts by mass of a ceramic powder in a mixer to obtain a primary kneaded product by primary kneading;
  a secondary kneading step of mixing 2 to 6 parts by mass of a cross-linking agent, 5 to 9 parts by mass of a filler, 5 to 9 parts by mass of a cross-linking aid, 8 to 13 parts by mass of rosin, 12 to 16 parts by mass of bismaleimide and 7 to 12 parts by mass of yttrium oxide into the primary kneaded product to obtain a high strength heat resistant rubber kneaded product; and a forming step of forming the high strength heat resistant rubber kneaded product obtained in the secondary kneading step to obtain a rubber product.

It is note that the components and the content thereof in each step of the process are the same in the description above of the composition.

BEST MODE FOR CARRYING OUT THE INVENTION

The high strength heat-resistant rubber composition according to the present invention is characterized in that the high strength heat resistant rubber composition having both excellent strength and heat resistance, comprising: 80 to 85 parts by mass of a rubber base material; 5 to 11 parts by mass of attapulgite; 40 to 50 parts by mass of a linear low-density polyethylene; 4 to 6 parts by mass of a ceramic powder; 2 to 6 parts by mass of a cross-linking agent; 5 to 9 parts by mass of a filler; 5 to 9 parts by mass of a cross-linking aid; 8 to 13 parts by mass of rosin; 12 to 16 parts by mass of bismaleimide; and 7 to 12 parts by mass of yttrium oxide.

In a preferred embodiment of the invention, the filler comprises; 5 to 10 parts by mass of CaSO4; 5 to 11 parts by mass of montmorillonite; 5 to 10 parts by mass of calcium silicate; 3 to 6 parts by mass of sodium stearate; 4 to 7 parts by mass of zinc oxide; and 1 to 2 parts by mass of a carbon black.

The carbon black used as a filler is not necessarily essential component depending on application of the rubber product or may be included for coloring the other pigments and dyes.

Further, montmorillonite is a kind of a swellable clay mineral (silicate mineral) and belongs to a smectite group. Montmorillonite can be replaced with the other smectites.

Furthermore, the cross-linking agent is preferably a silane coupling agent. Specifically, a silane coupling agent KH 550 and a polyamide 650 are preferably used.

In the invention, the cross-linking aid is preferably dicumyl peroxide (DCP).

In a preferred embodiment of the invention, the ceramic powder preferably comprises a waste ceramic powder in view of the reduction of cost and recycle of waste.

Further, the average particle diameter of the ceramic powder is not especially limited and is suitably selective in accordance with the intended application of the rubber product. The average particle diameter of the ceramic powder (D50) is preferably 10 to 120 μm, more preferably 20 to 100 particularly preferably 30 to 80 mm.

The average particle diameter (D50) can be measured by using a laser diffraction/scattering type particle size distribution measuring device that is commonly used by those skilled in the art for particle size measurement. For example, it can be determined based on the particle size distribution measured by the laser diffraction/scattering method according to a conventional method with using "Microtrac MT3000" (manufactured by Nikkiso Co., Ltd, Japan).

The rubber base material is not limited to a specific natural rubber or a synthetic rubber as long as it is a rubber material capable of forming a rubber component, but from the viewpoint of improving the characteristics, it is particularly desirable to include natural rubber.

Although the present invention is not bound by any theory, the components of the present invention described above will be described below, including the mechanism of action thereof.

Attapulgite as a component of the composition is a natural silicate mineral mainly composed of hydrous magnesium and aluminum silicate and is a kind of adsorptive clay that is also collectively called acid clay. Attapulgite however is different from bentonite and kaolin such as adsorbent clays as well as Attapulgite. Attapulgite has a hollow needle-like structure and exhibits excellent colloidal properties and adsorptivity. Therefore, it is presumed that the combination of Attapulgite with other components can improve strength and heat resistance of the resulting rubber product.

A rosin is an amorphous natural resin obtained by distilling balsams such as pine resin, which is a sap of a Pinaceae plant. The rosin has a relatively reactive chemical structure and thus it is presumed that the composite with the other components can improve strength and heat resistance of the resulting rubber product.

Bismaleimide as a component of the composition is a component to be impart heat resistance and includes various bismaleimide derivatives. For example, bismaleimide includes 4,4'-diphenylmethane bismaleimide, m-phenylene bismaleimide, bisphenol-A-diphenyl ether bismaleimide, 3,3'-dimethyl-5,5'-diethyl-4,4'-diphenylmethane bismaleimide, 4-Bismaleimides such as methyl-1,3-phenylene bismaleimide, 1,6'-bismaleimide-(2,2,4-trimethyl)hexane.

Yttrium oxide ($Y_2O_3$: Yttrium (III) oxide) is an oxide of yttrium to be stable in air, and is expected to act in cooperation with other compounding components to improve the properties as a rubber product. Specifically, it is presumed that Yttrium oxide promotes the formation of a connecting network of yttrium oxide with the above-mentioned bismaleimide and the other than yttrium oxide, and the connecting network sufficiently bonds to the rubber. As a result, a heat resistance performance of the rubber is improved.

Further, the process for producing a high strength heat resistant rubber composition having both excellent strength and heat resistance according to the invention is characterized in that the process comprises the steps of:

a primary kneading step of supplying and mixing 80 to 85 parts by mass of a rubber base material, 5 to 11 parts by mass of attapulgite, 40 to 50 parts by mass of a linear low-density polyethylene and 4 to 6 parts by mass of a ceramic powder in a mixer to obtain a primary kneaded product by primary kneading;

a secondary kneading step of mixing 2 to 6 parts by mass of a cross-linking agent, 5 to 9 parts by mass of a filler, 5 to 9 parts by mass of a cross-linking aid, 8 to 13 parts by mass of rosin, 12 to 16 parts by mass of bismaleimide and 7 to 12 parts by mass of yttrium oxide into the primary kneaded product to obtain a high strength heat resistant rubber kneaded product; and a forming step of forming the high strength heat resistant rubber kneaded product obtained in the secondary kneading step to obtain a rubber product.

The components used in each step and the content range thereof are the same as those described in the above composition.

In the above process, first, the ceramic powder in a rubber composition acts as a skeleton linkage to contribute to further development of the strength of the rubber product. At the same time, when mixing and kneading the ceramic powder and a filler (for example, $CaSO_4$, montmorillonite, calcium silicate, sodium stearate, zinc oxide and carbon black), the ceramic powder functions as a connecting medium to reliably connect fillers each other. As a result, a connecting network of the ceramic powder and filler is formed and subsequently the ceramic powder and filler as a stable network are sufficiently mixed with the natural rubber thereby the strength and heat resistance of the rubber are improved.

Further, the cross-linking aid DCP has a function of curing the rubber and further a rosin has an excellent flowability. These functions are fully put to practical use to allow bismaleimide and yttrium oxide to be sufficiently mixed with other components. It is considered that bismaleimide and yttrium oxide at this time form another connecting network to bond sufficiently well with the rubber thereby the heat resistance of the rubber is improved.

EXAMPLES

Hereinafter, the present invention will be described by way of examples but the present invention is not limited to the description of the examples below.

Example 1

The high-strength heat-resistant rubber composition of the example includes, in terms of parts by mass, 80 parts of a natural rubber; 5 parts of attapulgite; 40 parts of a linear low-density polyethylene; 4 parts of a waste ceramic powder; 2 parts of a cross-linking agent; 5 parts of a filler; 5 parts of a cross-linking aid; 8 parts of a rosin; 12 parts of bismaleimide; and 7 parts of yttrium oxide.

Further, the filler includes, in terms of parts by mass, 5 parts of $CaSO_4$, 5 parts of montmorillonite; 5 parts of calcium silicate; 3 parts of sodium stearate; 4 parts of zinc oxide; and 1 part of a carbon black.

The cross-linking agent is a silane coupling agent, especially silane coupling agent KH550. Polyamide-650 can also be used as the silane coupling agent.

The crosslinking aid is DCP.

In the example, a rubber product was manufactured by the following steps 1 to 3.

Step 1: a primary kneading step of supplying and mixing the defined above parts by mass of a natural rubber, a waste ceramic powder, attapulgite and a linear low-density polyethylene in an internal mixer to obtain a primary kneaded product by primary kneading for 2 hours at 60° C.;

Step 2: a secondary kneading step of mixing the defined above parts of a cross-linking agent, a filler, a cross-linking aid, a rosin, bismaleimide and yttrium oxide into the primary kneaded product to obtain a heat resistant rubber kneaded liquid by secondary kneading for 2 hours at 120° C.; and Step 3: a forming step of forming a heat resistant rubber product from the heat resistant rubber kneaded liquid obtained in the secondary kneading step to obtain a rubber product by a rubber product molding method.

An injection molding method was used as the rubber product molding method.

Example 2

The high-strength heat-resistant rubber composition of the example includes, in terms of parts by mass, 83 parts of a natural rubber; 8 parts of attapulgite; 45 parts of a linear low-density polyethylene; 5 parts of a waste ceramic powder; 4 parts of a cross-linking agent; 7 parts of a filler; 7 parts of a cross-linking aid; 8 parts of a rosin; 14 parts of bismaleimide; and 10 parts of yttrium oxide.

Further, the filler includes, in terms of parts by mass, 8 parts of $CaSO_4$; 8 parts of montmorillonite; 8 parts of calcium silicate; 4 parts of sodium stearate; 5 parts of zinc oxide; and 2 parts of a carbon black.

The cross-linking agent is a silane coupling agent, especially silane coupling agent KH550. Polyamide-650 can also be used as the silane coupling agent.

The crosslinking aid is DCP.

In the example, a rubber product was manufactured by the following steps 1 to 3.

Step 1: a primary kneading step of supplying and mixing the defined above parts by mass of a natural rubber, a waste ceramic powder, attapulgite and a linear low-density polyethylene in an internal mixer to obtain a primary kneaded product by primary kneading for 3 hours at 70° C.;

Step 2: a secondary kneading step of mixing the defined above parts of a cross-linking agent, a filler, a cross-linking aid, a rosin, bismaleimide and yttrium oxide into the primary kneaded product to obtain a heat resistant rubber kneaded liquid by secondary kneading for 3 hours at 130° C.; and Step 3: a forming step of forming a heat resistant rubber product from the heat resistant rubber kneaded liquid obtained in the secondary kneading step to obtain a rubber product by a rubber product molding method.

A press molding method was used as the rubber product molding method.

Example 3

The high-strength heat-resistant rubber composition of the example includes, in terms of parts by mass, 85 parts of a natural rubber; 11 parts of attapulgite; 50 parts of a linear low-density polyethylene; 6 parts of a waste ceramic powder; 6 parts of a cross-linking agent; 9 parts of a filler; 9 parts of a cross-linking aid; 13 parts of a rosin; 16 parts of bismaleimide; and 12 parts of yttrium oxide.

Further, the filler includes, in terms of parts by mass, 10 parts of $CaSO_4$; 11 parts of montmorillonite; 10 parts of calcium silicate; 6 parts of sodium stearate; 7 parts of zinc oxide; and 2 parts of a carbon black.

The cross-linking agent is a silane coupling agent, especially silane coupling agent KH550. Polyamide-650 can also be used as the silane coupling agent.

The crosslinking aid is DCP.

In the example, a rubber product was manufactured by the following steps 1 to 3.

Step 1: a primary kneading step of supplying and mixing the defined above parts by mass of a natural rubber, a waste ceramic powder, attapulgite and a linear low-density polyethylene in an internal mixer to obtain a primary kneaded product by primary kneading for 2.5 hours at 75° C.;

Step 2: a secondary kneading step of mixing the defined above parts of a cross-linking agent, a filler, a cross-linking aid, a rosin, bismaleimide and yttrium oxide into the primary kneaded product to obtain a heat resistant rubber kneaded liquid by secondary kneading for 2.5 hours at 120° C.; and Step 3: a forming step of forming a heat resistant rubber product from the heat resistant rubber kneaded liquid obtained in the secondary kneading step to obtain a rubber product by a rubber product molding method.

A wrap forming method was used as the rubber product molding method.

The rubber product molding method according to the present invention is not limited to the methods used in Examples 1 to 3 described above, and any conventionally known rubber molding method such as a transfer molding method can be used.

The high-strength heat-resistant rubber products obtained thus above were evaluated. The results of evaluation are shown in Table 1 below.

It should be noted that the density was measured by using the measuring method B of the sulfurized rubber or the thermoplastic rubber density of GB/T533-2008.

The hardness test was carried out by using the Shore hardness method which is Part I of the GB/T5331.1-2008 vulcanized rubber or thermosetting rubber indentation hardness test method.

TABLE 1

Results of evaluation of characteristic each of high strength and heat resistant rubber according to the invention

| Measurement Item | Measurement Standard | Example 1 | Example 2 | Example 3 |
|---|---|---|---|---|
| Density | GB/T 533-2008 | 1.210 | 1.212 | 1.212 |
| Shore hardness | GB/T 5331.1-2008 | 51 | 52 | 52 |
| Elongation at break point (%) | GB/T 528-2009 | 620 | 619 | 620 |
| Permanent strain (%) | GB/T 528-2009 | 20 | 21 | 21 |
| Heat resistant temperature | HG/T 3847-2008 | 300 | 300 | 300 |

As can be understood from Table 1, the high strength heat resistant rubber product according to the invention has a high density, a sufficiently high strength, excellent elasticity, elongation at break and permanent strain and also has excellent heat resistance as achieving heat resistant temperature up to 300° C.

As will be appreciated by those skilled in the art, the invention is not limited by the description of the above embodiments. The above examples and specification are merely for explaining the principle of the invention. Various modifications and improvements can be made without departing from the spirit and scope of the invention. All such modifications and improvements are included in the scope of the invention as claimed. Further, the scope of protection as claimed in the claims includes not only the scope of the claims but also equivalents thereof.

The invention claimed is:

1. A heat resistant rubber composition, comprising:
   80 to 85 parts by mass of a rubber base material;
   5 to 11 parts by mass of attapulgite;
   40 to 50 parts by mass of a linear low-density polyethylene;
   4 to 6 parts by mass of a ceramic powder;
   2 to 6 parts by mass of a cross-linking agent;
   5 to 9 parts by mass of a filler;
   5 to 9 parts by mass of a cross-linking aid;
   8 to 13 parts by mass of rosin;
   12 to 16 parts by mass of bismaleimide; and
   7 to 12 parts by mass of yttrium oxide.

2. The heat resistant rubber composition according to claim 1, wherein the filler comprises;
   5 to 10 parts by mass of CaSO4;
   5 to 11 parts by mass of montmorillonite;
   5 to 10 parts by mass of calcium silicate;
   3 to 6 parts by mass of sodium stearate;
   4 to 7 parts by mass of zinc oxide; and
   1 to 2 parts by mass of a carbon black.

3. The heat resistant rubber composition according to claim 1, wherein the cross-linking agent is a silane coupling agent.

4. The heat resistant rubber composition according to claim 1, wherein the cross-linking aid is dicumyl peroxide (DCP).

5. The heat resistant rubber composition according to claim 1, wherein the ceramic powder comprises a waste ceramic powder and the rubber base material comprises a natural rubber.

6. The heat resistant rubber composition according to claim 1, wherein the ceramic powder has an average particle diameter (D50) of 10 to 120 μm.

7. A process for producing a heat resistant rubber composition comprising the steps of:
   a primary kneading step of supplying and mixing 80 to 85 parts by mass of a rubber base material, 5 to 11 parts by mass of attapulgite, 40 to 50 parts by mass of a linear low-density polyethylene and 4 to 6 parts by mass of a ceramic powder in a mixer to obtain a primary kneaded product by primary kneading;
   a secondary kneading step of mixing 2 to 6 parts by mass of a cross-linking agent, 5 to 9 parts by mass of a filler, 5 to 9 parts by mass of a cross-linking aid, 8 to 13 parts by mass of rosin, 12 to 16 parts by mass of bismaleimide and 7 to 12 parts by mass of yttrium oxide into the primary kneaded product to obtain a heat resistant rubber kneaded product; and
   a forming step of forming the heat resistant rubber kneaded product obtained in the secondary kneading step to obtain a rubber product.

8. The process according to claim 7, wherein the filler comprises;
   5 to 10 parts by mass of CaSO4;
   5 to 11 parts by mass of montmorillonite;
   5 to 10 parts by mass of calcium silicate;
   3 to 6 parts by mass of sodium stearate;
   4 to 7 parts by mass of zinc oxide; and
   1 to 2 parts by mass of a carbon black.

9. The process according to claim 7, wherein the cross-linking agent is a silane coupling agent.

10. The process according to claim 7, wherein the cross-linking aid is dicumyl peroxide (DCP).

11. The process according to claim 7, wherein the ceramic powder comprises a waste ceramic powder and the rubber base material comprises a natural rubber.

12. The process according to claim 7, wherein the ceramic powder has an average particle diameter (D50) of 10 to 120 μm.

* * * * *